Patented Apr. 27, 1943

2,317,631

UNITED STATES PATENT OFFICE 2,317,631

COMPOSITION FOR PRESERVING CUT FLOWERS

August A. Meyer, Maywood, Ill.

No Drawing. Application October 7, 1942,
Serial No. 461,229

3 Claims. (Cl. 71—2)

This invention relates to a composition of certain chemicals adapted to be added to water in which cut flowers are inserted, said composition causing favorable reactions including stimulating the development of said flowers and substantially prolonging their normal span of life.

Cut flowers, with their stems placed in water normally remain in bloom for a comparatively short period in the average warm room temperatures. Even in more favorably cool temperatures, cut flowers after being in water for a short time are affected by oxidation. This is because the atmosphere absorbs moisture from the petals and leaves more quickly than the flowers can replace the same from the water in which the stems are inserted. This results in the decay and decomposition of the stems, and the wilting, shriveling and dropping off of the petals and leaves.

The water into which the stems of the cut flowers are inserted sours within a comparatively short time. Chemical changes occur in the water due to its contact with the stems. Bacteria continues to increase. This condition of the water tends to clog the openings in the stems as well as to cause decay in the stems, resulting in preventing the stems from drawing water for the petals and leaves. Further development of the flowers is retarded and their life span is substantially shortened.

Clipping of the stems from day to day, changing the water at frequent intervals, providing cooler temperatures are expedients which have been used, but they are hardly worth their trouble and inconvenience as they merely lengthen the life of cut flowers a very short time.

It is among the objects of this invention to provide a composition for substantially prolonging the life of cut flowers, for developing the blooms of cut flowers to their maximum maturity and for preserving said cut flowers at their greatest beauty for periods far beyond their normal span of life, in room temperatures.

It is also an object of my invention to create a composition of chemicals which cooperate with each other, and are adapted to be added to and dissolved in water, into which cut flowers are inserted, said composition killing the bacteria, sterilizing the water and preventing souring of the same, thus leaving the openings of the stems unclogged and free to absorb the solution for the petals and leaves; said composition initiating chemical reactions in the solution to create a predigested food for the quick development of the blooms to maximum maturity and to provide a steady food during the prolonged life of the cut flowers; said composition in said solution also acting to harden and strengthen the fibrous structure of the stems, petals and leaves and delay decay therein and to enrich the color of the blooms, all without adding or changing water during the life of the cut flowers.

Another object of my invention is to supply a composition combining chemical and food properties to provide a properly balanced food, sterilizer, astringent and carrier.

My invention also comprises such other objects, advantages and capabilities which will later more fully appear and which are inherently possessed by my invention.

While I have shown herein my preferred compositions, yet I wish it understood that the same are susceptible of modification and change without departing from the spirit of my invention.

A preferred composition selected to illustrate my invention comprises a mixture of the following in dry powder form: Hydrazine sulphate ($NH_2NH_2.H_2SO_4$), a nutrient, preferably cane sugar and a substantially non-poisonous antiseptic, preferably calcium hypochlorite. My composition may also include manganese sulphate or iron oxide. A further addition to my composition may be aluminum sulphate or aluminum sodium sulphate (soda alum).

The relative proportions by weight of the ingredients of my preferred composition are as follows: 23 to 43 pounds of hydrazine sulphate, 42 to 82 pounds of either manganese sulphate or iron oxide, 3 to 5 pounds of calcium hypochlorite and 3,125 to 5,125 pounds of cane sugar, or equivalent nutrient.

I may omit the manganese sulphate or iron oxide. I may substitute for calcium hypochlorite any equivalent antiseptic which is substantially non-poisonous. I may also add to my preferred composition from 23 to 43 pounds of aluminum sulphate or soda alum. I may also make up my composition without the nutrient.

In mixing my composition, it is desirable that a departure from the high or low quantities specified, and within the respective ranges for any one of the respective ingredients should be accompanied by a substantially corresponding or proportionate reduction or increase from the high or low limits of each of the other ingredients specified in the above illustration.

My composition is in the form of a dry powder. I prefer to pack it in individual packages of substantially 1¼ ounces for home use. The user empties the composition out of the package into a vase or other container holding substantially 2 quarts of water. This will adequately take care of two dozen cut flowers without change of water during the life of the blooms, which is extended from two to seven days. I also pack my composition in larger packages for growers and florists in commercial use and for shows, exhibitions, hospitals and institutions.

Upon being placed into water, in which there are flowers, the calcium hypochlorite or other suitable equivalent antiseptic, kills the undesirable bacteria, which normally would cause a souring or liquor fermentation of the water, and clogging of the openings of the stems of the flowers. The antiseptic also acts as an astringent. The openings of the stems are therefore free for the absorption of the solution.

The solution enters the stems, petals and leaves of the flowers and the hydrazine sulphate being a partly predigested food, is easily and readily assimilated. The nitrogen therein is of particular importance in causing growth. There is no over feeding of the flowers causing temporary intoxication or sluggishness, but a rapid healthy development. The buds mature to blooms, and the blooms are strong and healthy. They are steadily fed by the solution, which they are enabled to receive through the free openings in the stems. Oxidation is substantially retarded and the life span of the flowers is greatly increased.

When aluminum sulphate or soda alum is added to the composition, the solution also acts to harden the fibrous structure of the stems, strengthen the connecting rib between the stem and the petals, and make the petals more firm. This increased tensile strength enables the flowers to withstand oxidation.

The addition of manganese sulphate or iron oxide to the composition provides the solution with means for enriching and deepening the color of the blooms, as well as quickening the absorption of the solution and strengthening the structure of the flowers.

The hydrazine sulphate, the manganese sulphate, or iron oxide, the calcium hypochlorite and the aluminum sulphate or soda alum are all ingredients in the solution which act to carry the solution into and through the stems to the flower heads, and increase the speed of such movement.

The solution causes the continual growth and development of the flowers, substantially as if the flowers were still growing in the soil in which they had been prior to cutting.

Having thus described my invention, I claim:

1. A composition adapted to be added to and dissolved in water in which the stems of cut flowers are placed for causing the continuous growth and development of said cut flowers and prolonging their span of life, consisting of the following materials in powdered form in substantially the following proportions by weight: 23 to 43 pounds of hydrazine sulphate, 42 to 82 pounds of a compound selected from the class consisting of manganese sulphate and iron oxide, 3 to 5 pounds of calcium hypochlorite, and 3,125 to 5,125 pounds of sugar.

2. A composition adapted to be added to and dissolved in water in which the stems of cut flowers are placed for causing the continuous growth and development of said cut flowers and prolonging their span of life, consisting of the following materials in powdered form in substantially the following proportions by weight: 23 to 43 pounds of hydrazine sulphate, 3 to 5 pounds of calcium hypochlorite, and 3,125 to 5,125 pounds of sugar.

3. A composition adapted to be added to and dissolved in water in which the stems of cut flowers are placed for causing the continuous growth and development of said cut flowers and prolonging their span of life, consisting of the following materials in powdered form in substantially the following proportions by weight: 23 to 43 pounds of hydrazine sulphate, 42 to 82 pounds of a compound selected from the class consisting of manganese sulphate and iron oxide, 3 to 5 pounds of calcium hypochlorite, 23 to 43 pounds of a compound selected from the class consisting of aluminum sulphate and soda alum and 3,125 to 5,125 pounds of sugar.

AUGUST A. MEYER.